United States Patent
Losehand

(10) Patent No.: US 8,628,865 B2
(45) Date of Patent: Jan. 14, 2014

(54) METHOD FOR PRODUCING SHEETS FROM RENEWABLE RAW MATERIALS IN A CONTINUOUS PROCESS AND SHEET OF RENEWABLE RAW MATERIALS

(75) Inventor: Christian Losehand, Waren (DE)

(73) Assignee: Strohlos Produktentwicklung KG, Waren (Mueritz) (DE)

( * ) Notice: Subject to any disclaimer, the term of this patent is extended or adjusted under 35 U.S.C. 154(b) by 59 days.

(21) Appl. No.: 13/381,055

(22) PCT Filed: Jul. 6, 2009

(86) PCT No.: PCT/EP2009/058481
§ 371 (c)(1),
(2), (4) Date: Feb. 6, 2012

(87) PCT Pub. No.: WO2011/003436
PCT Pub. Date: Jan. 13, 2011

(65) Prior Publication Data
US 2012/0128992 A1    May 24, 2012

(51) Int. Cl.
*C04B 28/10* (2006.01)
*C04B 28/32* (2006.01)
*B27N 3/00* (2006.01)

(52) U.S. Cl.
USPC ........... 428/703; 264/37.3; 264/112; 264/118

(58) Field of Classification Search
None
See application file for complete search history.

(56) References Cited

U.S. PATENT DOCUMENTS

| 3,963,849 | A | 6/1976 | Thompson |
| 5,632,848 | A | 5/1997 | Richards et al. |
| 7,255,907 | B2 * | 8/2007 | Feigin et al. ................ 428/70 |
| 2006/0070321 | A1 * | 4/2006 | Au ............................. 52/232 |
| 2009/0025850 | A1 | 1/2009 | Feigin et al. |

FOREIGN PATENT DOCUMENTS

| DE | 28 41 172 | 4/1980 |
| DE | 198 10 862 | 9/1999 |
| DE | 198 11 807 | 9/1999 |
| DE | 198 29 261 | 1/2000 |
| DE | 10 2007 026 638 | 12/2008 |

* cited by examiner

*Primary Examiner* — Mary F Theisen
(74) *Attorney, Agent, or Firm* — Jordan and Hamburg LLP

(57) ABSTRACT

The invention relates to a method for producing a sheet from renewable raw materials. In the method, after mixing a composition to produce a sheet from renewable raw materials, this composition is applied to a conveyor belt. Protruding materials or unevennesses are eliminated with the aid of a device, preferably a simple doctor blade. Without supplying heat, the composition is then subjected to a first drying process on the conveyor belt, before the endless sheet created in this way is cut into sections. The sections are then passed on to final drying in a storage device. After complete drying, regions at the extremities of the sections that have been adversely affected by cutting up the endless sheet are removed from these sections and chopped up into chips. These chips are returned to the further production process in a final method step by feeding them into the composition for producing a sheet from renewable raw materials.

12 Claims, No Drawings

METHOD FOR PRODUCING SHEETS FROM RENEWABLE RAW MATERIALS IN A CONTINUOUS PROCESS AND SHEET OF RENEWABLE RAW MATERIALS

BACKGROUND OF THE INVENTION

The invention relates to a method for producing sheets from renewable raw materials in a continuous process which stands out against previously known methods through an essentially lesser energy demand.

In addition, the invention relates to a sheet which is produced with the method according to the invention.

Structural members made of renewable raw materials, especially for interior finishing work as well, are on increasing demand by wide consumer circles. Mostly, they have lower prices in contrast to structural members made of slowly growing natural raw materials. Compared with the artificial structural members, they are also preferred because they can be environment-friendly produced and provide a better atmosphere. In order to get the great demand under control manufacturing methods employing a continuous process are particularly suitable.

Conventional continuous processes—not only for producing sheets from renewable raw materials—provide that a mixture from that raw material and a binding agent are processed into a sheet using pressure and/or temperature.

Sheets from renewable raw materials and methods for producing thereof are then known. In the publication DE 28 41 172 A1, there is disclosed a multi-purpose sheet which is made of vegetable materials of agricultural source and/or wood material as well as of another additives. For the production, the above mentioned ingredients provided with binding agents are integrated into a sheet fill and are further processed into a sheet using pressure and temperature. Cement, gypsum or comparable materials are used as binding agents.

In the publication DE 198 10 862 C2, there is also disclosed a method by means of which insulating boards can be produced from renewable raw materials—in this case being of very finely sliced and spliced open straw—using the supply of pressure and temperature. The treatment of material is very cost-intensive. Both above mentioned methods additionally require pressure as well as heating up in order to cause the sheets produced therewith to reach a condition in which they can be further processed. With the last mentioned insulating board it is even necessary to additionally carry out a precompaction. Applying the raw materials with pressure is very expensive because of the application of great presses which have to be operated and maintained. Also, supplying of heat involves high amount of energy.

In the publication DE 19811807 A1, there is presented the production of an insulating member by means of which, in the intermittent process the individual components are mixed with each other, and then this mixture is added into moulds and is pressed, respectively, and in the continuous process the mixture is added into a belt-type press or plate-type press and is shaped under pressure. Even though a reduction of the high amount of energy is already achieved by this type of production without any influence of temperature, applying pressure requires operation of a machine and thereby increases expense for energy. This is disadvantageous.

In the publication DE 198 29 261 A1, there is disclosed a method according to which renewable raw materials such as e.g. straw or grass are subjected to shredding and are then mixed with a binding agent. This mixture is afterwards deposited upon a conveyor belt having a side limit stop and, as necessary, is processed into the final product under light pressure and through a thermal treatment. With this invention, heat is used to solidify the mixture consisting of renewable raw materials and binding agents to a sheet. For the production of this sheet also high energy consumptions to operate such devices required for the thermal treatment are to be taken into account as well.

From the German Offenlegungsschrift DE 1 0 2007 026 638 A1, there is known a sheet having heat resistance which is produced from renewable raw materials. In this sheet the renewable raw materials are mixed with a binding agent consisting of magnesium carbonate, magnesium oxide, magnesium chloride and water, and are constrained to harden in moulds. Disadvantages of this sheet are that it is comparatively heavy and not capable of being produced in an endless process.

SUMMARY OF THE INVENTION

And so it is an object of the invention to provide a continuous production method by means of which sheets from renewable raw materials can be produced more cost effectively than according to conventional methods.

In addition, the invention simultaneously relates to a sheet from renewable raw materials which is produced in a continuous method and which besides fulfils high demands regarding stability, processibility and high temperature resistance.

In the continuous production method of sheets from renewable raw materials, in accordance with first of all a mixture of renewable raw materials, a binding agent and glass beads as well as additional admixtures as necessary is mixed for the production of the sheet. The binding agent can then be constituted of magnesium carbonate, magnesium oxide, magnesium chloride and water in order to achieve fire resistant properties.

This mixture is placed upon a conveyor belt having side limit stops to obtain a sheet of constant width. The thickness of this mixture depends on which thickness the sheet to be produced should have in the end. So, according to the method, sheets are allowed to be produced with thicknesses of up to 10 centimeters. Straw chaffs protruding upwardly beyond this mixture or other unevenness of, or protrusions on, the surface of the mixture deposited on the conveyor belt are levelled by means of a doctor blade. Thus, plane surfaces are created on the bottom surface through the conveyor belt and on the top surface by means of the doctor blade. After a period of drying in the air this sheet is slit by means of a knife or a saw into individual sheets. After cutting the not yet being completely dried sheet, the separated pieces have uneven edges resulting from the cutting and thus are not yet suitable for their intended uses. With these uneven edges the sheets are conveyed to a location for final drying in the air.

In a next step, the sheets now being completely dried through and through, are then removed and the unevenly cut marginal zones of the sheets are detached as residual pieces, leaving the sheets with even end edges. With a right selection of the cutting distances during the initial separating, sheet sizes can be reached also with greater areas to be detached which meet the demand of the building industry and the prescriptions for starting materials, respectively. In a next step, the residual pieces are broken up and subjected to granulating. In a last step, this granular material is fed again into the production process of the sheet from renewable raw materials according to the invention.

The thinner the sheet produced according to the method is, the less scrap is to be expected since thin sheets dry well already on the conveyor belt and so ragged cutting can be avoided. The thicker the sheet, the greater are the cutting distances are to be selected.

Conceivably any further steps will precede this production process and will be integrated into it, respectively. As an example, the application of a decorative layer on the conveyor belt upon which the mixture is then applied can here be mentioned.

So, one obtains a sheet provided with a decorative layer on one side. Applying an additional decorative layer after the sheet has been treated with the doctor blade is possible as well. At the same time, sheets can also be created from various layers in which the layers have different material compositions. Thus, for a layer being further outwardly situated, finer raw materials can be mixed with the respective binding agents into a mixture, whereas in a central layer, use is made of coarser raw materials. In any event, particular constituents, such as, e.g. granules, can be omitted from individual layers.

After applying of any layer, a doctor blade can be used for smoothing in each case; however, it is also conceivable that only the closing final layer is treated with the doctor blade before it is fed to the drying process and provided with a decorative layer, respectively. To increase the stability of the sheet inclusion of reinforcements is also possible wherein, advantageously, these reinforcements should consist of renewable raw materials as well.

With a production according to said method it is of particular advantage that no further inputs of energy are necessary apart from that energy needed for applying the materials and for carrying and making ready though, to satisfy an order having a tight deadline, such drying can be accelerated by heat supply. Furthermore, all waste materials created during the production process can be taken over again in the production cycle without problems such that no production scraps are created which even should have to be disposed at the owner's expense if necessary.

The sheet produced according to the method has the particular advantage of having better fire resistant properties than the fire resistant sheet according to the prior art due to inclusion of glass beads, but it is distinctly more lightweight. So, the sheet is useful for a wider variety of applications and is easier to manipulate. Glass beads may constitute up to 50%, by weight, of the mixture for producing a sheet from renewable raw materials, but, preferably, constitute only 10 to 30%, by weight, of the mixture and, in a particularly preferred embodiment, 10 to 20%, by weight, of the mixture should consist of glass beads.

It is impossible or, at least, difficult to burn the residual pieces, for example, to produce heat, because they are fire resistant, combustible components thereof being in a chopped or a granular form inside the sheet as an admixture. As a result, the especially environmentally advantageous nature of this sheet becomes even more apparent.

Wood chips and wood shavings, respectively, or timber waste which even the paper industry can no longer utilize and waste of textile industry may also be included, in small quantities in the mixture for producing a sheet.

Sheets may be produced according to the invention without any pressure application and heating by a batch process rather than a continuous process, such batch process being inferior to a continuous process regarding rate of production but having the advantage that no residual pieces which have to be granulated are created. So, other materials such as e.g. the waste from the paper industry, timber industry or textile industry mentioned above can be fed in higher proportions into the mixture from which the sheet is produced by a batch process.

The invention claimed is:

1. A method of producing sheets from renewable raw materials, comprising: making a mixture of renewable raw material with a binding agent, the binding agent comprising magnesium carbonate, magnesium oxide, water and glass beads; applying a layer of said mixture upon a conveyor belt and forming the applied mixture into an endless sheet on the conveyor belt;
    cutting the endless sheet into sections; removing marginal zones of said sections, the marginal zones each having a rough edge due to the cutting; processing said removed marginal zones into subdivided material and placing the subdivided material into said mixture, wherein protrusions or unevenness on surfaces of the layer after applying said mixture upon said conveyor belt are removed with a doctor blade, then a first air drying process of said mixture on said conveyor belt is carried out to form a partially dried endless sheet upon which said cutting into said sections is performed, then the partially dried sections are removed from the conveyor belt, each of said sections being a discrete partially dried sheet, and then air drying of the discrete sheets is completed.

2. The method of claim 1, further comprising applying a decorative layer to the conveyor belt before applying the mixture to the conveyor belt whereby the decorative layer forms a decorative surface on a face of the sheets opposing the conveyor belt.

3. The method of claim 1, further comprising, after removing unevenness and protrusions on an upper surface of the mixture with the doctor blade, applying a decorative layer to the upper surface thereby to form a decorative surface on a face of the sheets facing away from the conveyor belt.

4. The method of claim 1, further comprising, subsequent to said application of the doctor blade, forming at least one additional layer on the layer to which the doctor blade has been applied and applying the doctor blade to each additional layer to remove any unevenness and protrusions from an upper surface thereof.

5. The method of claim 1, further comprising, before said application of the doctor blade forming at least one additional layer on the layer on the conveyor belt.

6. The method of claim 4, wherein each said additional layer is of composition different from at least one other layer.

7. The method of claim 1, further comprising including in the mixture, an additional quantity of renewable raw material in a form functioning as reinforcement for the sheets.

8. A sheet produced by the method of claim 1, wherein the glass beads constitute 10 to 50%, by weight, of the mixture.

9. The sheet of claim 8, wherein the mixture comprises granular material.

10. The sheet of claim 8, wherein the subdivided marginal zones comprise granular material.

11. The sheet of claim 9, wherein the mixture further comprises at least one of wood chips, wood shavings, timber waste or textile waste.

12. The sheet of claim 10, wherein the mixture further comprises at least one of wood chips, wood shavings, timber waste or textile waste.

* * * * *